United States Patent
Salter et al.

(10) Patent No.: US 10,780,883 B2
(45) Date of Patent: Sep. 22, 2020

(54) PRECIPITATION DETECTION

(71) Applicant: Ford Global Technologies, LLC, Dearborn, MI (US)

(72) Inventors: Stuart C. Salter, White Lake, MI (US); Annette Lynn Huebner, White Lake, MI (US); Pietro Buttolo, Dearborn Heights, MI (US); Paul Kenneth Dellock, Northville, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 298 days.

(21) Appl. No.: 15/818,815

(22) Filed: Nov. 21, 2017

(65) Prior Publication Data

US 2019/0152477 A1    May 23, 2019

(51) Int. Cl.
| | |
|---|---|
| *B60W 30/14* | (2006.01) |
| *G01W 1/06* | (2006.01) |
| *G01P 5/165* | (2006.01) |
| *B60S 1/06* | (2006.01) |
| *B60W 10/18* | (2012.01) |
| *B60W 10/20* | (2006.01) |
| *B60W 10/04* | (2006.01) |
| *B60S 1/08* | (2006.01) |
| *G01P 5/16* | (2006.01) |
| *G01W 1/14* | (2006.01) |
| *G01P 3/00* | (2006.01) |

(52) U.S. Cl.
CPC ............ *B60W 30/143* (2013.01); *B60S 1/06* (2013.01); *B60S 1/0818* (2013.01); *B60S 1/0896* (2013.01); *B60W 10/04* (2013.01); *B60W 10/18* (2013.01); *B60W 10/20* (2013.01); *G01P 5/16* (2013.01); *G01P 5/165* (2013.01); *G01W 1/06* (2013.01); *G01W 1/14* (2013.01); *B60W 2555/20* (2020.02); *B60W 2710/18* (2013.01); *B60W 2710/20* (2013.01); *G01P 3/00* (2013.01)

(58) Field of Classification Search
CPC .... B60W 30/143; B60W 10/04; B60W 10/18; B60W 10/20; B60S 1/06; B60S 1/0818; B60S 1/0896
See application file for complete search history.

(56) References Cited

U.S. PATENT DOCUMENTS

| | | | |
|---|---|---|---|
| 7,516,002 B2* | 4/2009 | Veerasamy | ....... B32B 17/10036 |
| | | | 318/483 |
| 7,733,049 B2 | 6/2010 | Hiromoto et al. | |
| 2014/0309885 A1* | 10/2014 | Ricci | ...................... G06Q 30/00 |
| | | | 701/41 |
| 2014/0336935 A1* | 11/2014 | Zhu | .......................... G01W 1/00 |
| | | | 702/3 |
| 2017/0075036 A1 | 3/2017 | Pikhletsky et al. | |

FOREIGN PATENT DOCUMENTS

| | | | |
|---|---|---|---|
| CN | 106394501 A | 2/2017 | |
| DE | 102007043569 A1 | 3/2009 | |
| KR | 100228830 B1 | 11/1999 | |
| KR | 100375378 B1 | 3/2003 | |
| WO | 2006068561 | * 6/2006 | ............ B60S 1/0803 |

* cited by examiner

*Primary Examiner* — Anne Marie Antonucci
*Assistant Examiner* — Abdalla A Khaled
(74) *Attorney, Agent, or Firm* — Frank A. MacKenzie; Bejin Bieneman PLC

(57) ABSTRACT

An amount and type of precipitation, and a speed of a vehicle is determined. A component in the vehicle is actuated based on the amount and type of precipitation, and the speed of the vehicle.

20 Claims, 2 Drawing Sheets

PRECIPITATION DETECTION

BACKGROUND

Vehicles, such as fully or partially autonomous vehicles, include a variety of sensors. Some sensors detect the external world, for example, radar sensors, scanning laser range finders, light detection and ranging (lidar) devices, and image processing sensors such as cameras. A lidar sensor detects distances to objects by emitting laser pulses and measuring the time of flight for the pulse to travel to the object and back. It is a problem that precipitation can interfere with a lidar sensor such that the precipitation can impair or degrade data from a lidar sensor, e.g., can impair the detection of objects, e.g., accurately detecting a distance to an object.

DETAILED DESCRIPTION

Figure 1:
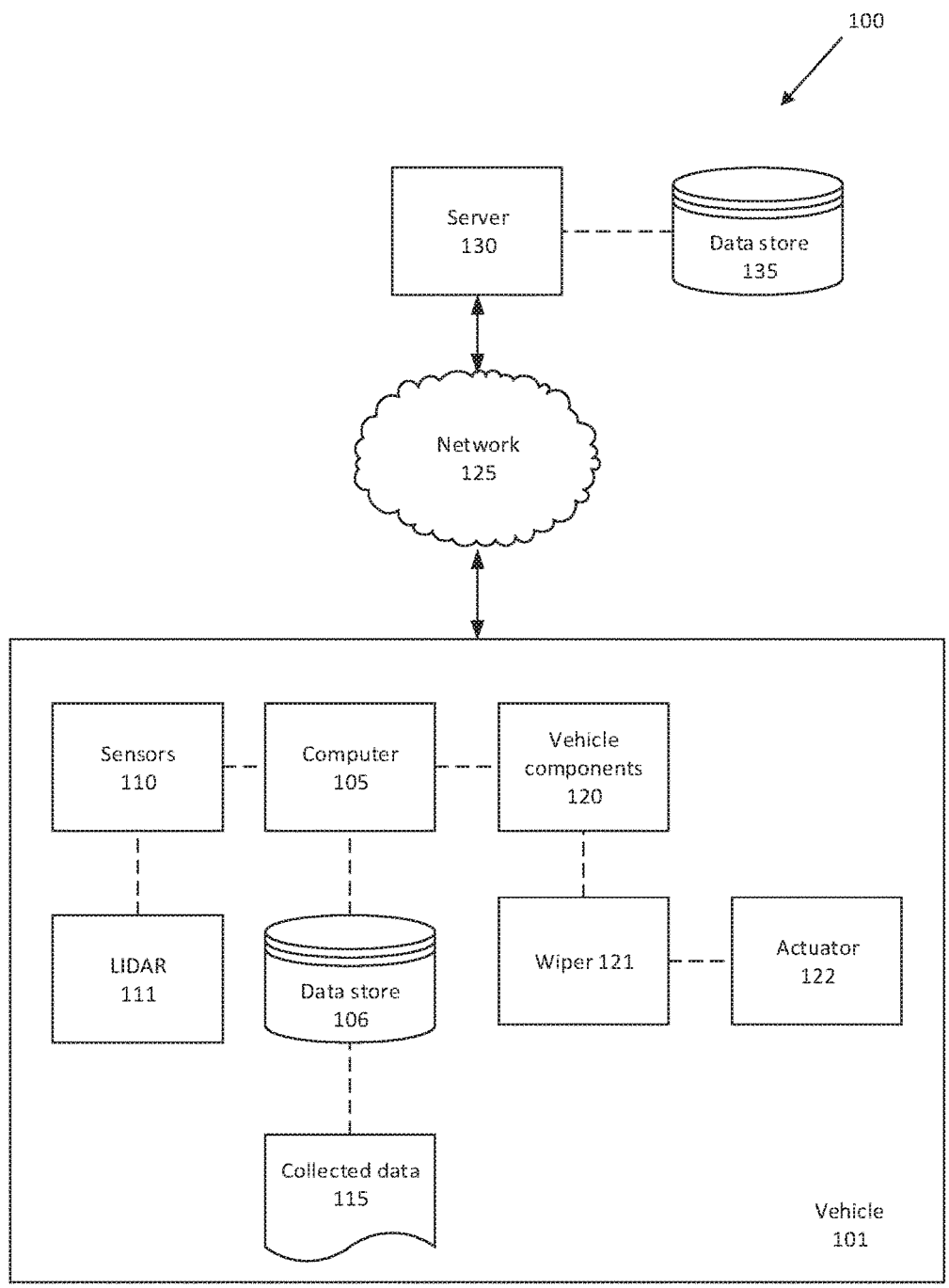
FIG. 1 is a block diagram of an example vehicle precipitation detection system.

A system includes a processor and a memory, the memory storing instructions executable by the processor to determine an amount and type of precipitation, and a speed of a vehicle, and actuate a component in the vehicle based on the amount and type of precipitation, and the speed of the vehicle.

The processor can be further programmed to determine a wiper speed based on the amount and type of precipitation, and the speed of the vehicle, and to actuate the component based on the wiper speed.

The component can be a wiper, and the processor is further programmed to actuate the wiper according to the wiper speed.

The processor can be further programmed to determine a second wiper speed based on the amount and type of precipitation, and the speed of the vehicle, and to actuate the component based on the second wiper speed.

The component can be one or both of a vehicle powertrain and a vehicle brake. The processor can be further programmed to change the speed of the vehicle based on the amount and type of precipitation, and the speed of a vehicle.

The processor can be further programmed to determine a wind speed relative to the vehicle, and to actuate the component based on the wind speed.

The processor can be further programmed to determine the type of precipitation based on an ambient temperature.

The component can be a vehicle steering, and the processor is further programmed to activate the vehicle steering.

A method includes determining an amount and type of precipitation, and a speed of a vehicle, and actuating a component in the vehicle based on the amount and type of precipitation, and the speed of the vehicle.

The method can further include determining a wiper speed based on the amount and type of precipitation, and the speed of the vehicle. Actuating the component in the vehicle based on the amount and type of precipitation, and the speed of the vehicle can include actuating the component based on the wiper speed.

The component can be a wiper. Actuating the component can include actuating the wiper according to the wiper speed.

The method can further include determining a second wiper speed based on the amount and type of precipitation, and the speed of the vehicle. Actuating the component in the vehicle based on the amount and type of precipitation, and the speed of the vehicle can include actuating the component based on the second wiper speed.

The component can be one or both of a vehicle powertrain and a vehicle brake. Actuating the component can include changing the speed of the vehicle based on the amount and type of precipitation, and the speed of a vehicle The method can further include determining a wind speed relative to the vehicle. Actuating the component in the vehicle based on the amount and type of precipitation, and the speed of a vehicle, can further include actuating the component based on the wind speed.

The method can further include determining the type of precipitation based on an ambient temperature.

The component can be a vehicle steering, and actuating the component includes activating the vehicle steering.

A system including a wiper, an actuator arranged to move the wiper and a processor programmed to determine an amount and type of precipitation, and a speed of a vehicle, and actuate a component in the vehicle based on the amount and type of precipitation, and the speed of the vehicle.

The processor can be further programmed to determine a wiper speed based on the amount and type of precipitation, and the speed of the vehicle, and actuate the component based on the wiper speed.

The component can be one or both of a vehicle powertrain and a vehicle brake. The processor can be further programmed to change the speed of the vehicle based on the amount and type of precipitation, and the speed of a vehicle.

The processor can be further programmed to determine the type of precipitation based on an ambient temperature.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

FIG. 1 illustrates an example system 100, including a computer 105 programmed to determine an amount and type of precipitation, and a speed of a vehicle 101, and to actuate a component 120 in the vehicle 101 based on the amount and type of precipitation, and the speed of the vehicle 101. A computer 105 in the vehicle 101 is programmed to receive collected data 115 from one or more sensors 110. For example, vehicle 101 data 115 may include a location of the vehicle 101, a location of a target (i.e., an object around the vehicle 101 such as another vehicle, a pedestrian, a road sign, etc.), etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle speed, a vehicle trajectory, etc.

The computer 105 is generally programmed for communications on a vehicle 101 network, e.g., including a communications bus, such as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively, or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any type, e.g., hard disk drives, solid state drives, servers, or any volatile or non-volatile media. The data store 106 may store the collected data 115 sent from the sensors 110.

Sensors 110 may include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of an object, determining the presence of a user, etc. The sensors 110 could also include short range radar, long range radar, and/or ultrasonic transducers.

One of the sensors 110 can be a lidar 111. The lidar 111 can emit a light beam and receive a reflected light beam reflected from an object, e.g., a second vehicle, a road sign, a tree, etc., and/or precipitation, e.g., rain, snow, etc. The computer 105 can measure a time elapsed from emitting the light beam to receiving the reflected light beam. Based on the time elapsed and the speed of light, the computer 105 can determine a distance between the lidar 111 and the object and/or the precipitation reflecting the light beam.

The computer 105 can compare the distance between the vehicle 101 and the object to a distance threshold. The computer can actuate vehicle components 120, as set forth further below, to maintain the distance between the vehicle 101 and the object, e.g., a second vehicle, above the distance threshold. The distance threshold is a distance value, e.g., a minimum distance, stored in the memory of the computer 105, and is determined as a distance from the vehicle 101, e.g., a radius from a center point or some other point within the vehicle 101, to the object, e.g., a second vehicle. The distance value can be based on the type and amount of precipitation, and the speed of the vehicle 101. The computer 105 could store a look-up table or the like specifying a list of distance thresholds along with the amount and type of precipitation and the speed of the vehicle 101, e.g., the distance threshold can be proportional to the amount of precipitation and the speed of the vehicle 101. The distance threshold may be determined according to the type and amount of precipitation at which it is empirically determined that the vehicle 101 can be safely operated given the speed of the vehicle 101.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. Each vehicle component 120 includes one or more hardware components adapted to perform a mechanical function or operation—such as moving the vehicle, slowing or stopping the vehicle, steering the vehicle, etc. Non-limiting examples of vehicle components 120 include conventional vehicle parts or subsystems, such as a vehicle powertrain, i.e., propulsion, component (that includes, e.g., an internal combustion engine and/or an electric motor, etc.), a transmission component, a vehicle steering component (e.g., that may include one or more of a steering wheel, a steering rack, etc.), a vehicle brake component, a park assist component, an adaptive cruise control component, an adaptive steering component, etc.

The vehicle 101 can include a wiper 121. The wiper 121 (or a plurality of wipers 121) can remove precipitation from a windshield of the vehicle 101. The computer 105 can actuate the wiper 121 when the computer 105 detects precipitation, e.g., upon detecting rain, snow, etc. The computer 105 can, for example, be programmed to actuate the wiper 121 based on the amount and type of precipitation detected and the speed of the vehicle 101. The computer 105 can actuate the wiper 121 until detecting that the precipitation event has ended.

The vehicle 101 can include an actuator 122 to move the wiper 121 from a first position to a second position, e.g., the wiper 121 can pivot about the actuator 122 from the first position to the second position. The actuator 122 can be any suitable mechanism, such as a motor, e.g., an electric motor, attached to a pivoting rod, a hydraulic cylinder attached to a pivoting rod. The computer 105 can send a message to the actuator 122 to move the wiper 121 from the first position to the second position. As the wiper moves from the first position to the second position, and, typically, back and forth between the two, the wiper 121 glides along the windshield of the vehicle 101 to remove precipitation from the windshield.

The vehicle 101 can include a human-machine interface (HMI) 123, e.g., one or more of a display, a touchscreen display, a microphone, a speaker, etc. The user can input data 115 into the HMI 123, e.g., selecting a driving mode. For example, the user can select to operate the vehicle 101 in an autonomous mode, i.e., the computer 105 operates the vehicle 101. When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 powertrain (typically including an electric motor and/or internal combustion engine), braking, and steering are controlled by the computer 105. A semi-autonomous mode is one in which at least one of vehicle 101 powertrain (typically including an electric motor and/or internal combustion engine), braking, and steering are controlled at least partly by the computer 105 as opposed to a human operator. Alternatively, the user can select to operate the vehicle in a manual mode, i.e., the user operates the vehicle 101. The HMI 123 can communicate with the computer 105 via the vehicle 101 network, e.g., the HMI 123 can send a message including the user input to the computer 105. The computer 105 can determine the driving mode based on the message from the HMI 123.

The computer 105 can be programmed to determine a type of precipitation with one or more sensors 110. As used herein, a "type" of precipitation is a physical state of precipitation detected by the computer 105, e.g., liquid (meaning rain) or solid (meaning snow, hail, or sleet). A temperature sensor 110 can determine the ambient temperature external to the vehicle 101. Ambient temperature in this context is the temperature around the vehicle 101, i.e., what may be referred to as outside or environmental temperature. The computer 105 can receive a message from the temperature sensor 110 indicating the ambient temperature and the computer 105 can compare the temperature to a threshold temperature, e.g., 32 degrees Fahrenheit. If the ambient temperature is above the threshold temperature, the computer 105 can determine that the precipitation is a liquid, i.e., rain. If the ambient temperature is below the threshold temperature, the computer 105 can determine that the precipitation is a solid, i.e., snow. As another example, the computer 105 can collect image data of precipitation striking the vehicle 101, and using image processing techniques to determine the type of precipitation.

The computer 105 can be further programmed to determine an amount of precipitation $A_w$ impacting the windshield according to data 115 from one or more sensors 110. As used herein, an "amount" of precipitation is a volume accumulated per unit of time. The computer can actuate a precipitation sensor 110 that is programmed to detect precipitation and collect data 115. The computer 105 can, upon receiving the data 115, determine the amount of the precipitation $A_w$ impacting the windshield. For example, the computer 105 can determine the amount of precipitation $A_w$ impacting the windshield when the precipitation sensor 110 receives light from an infrared light emitter emitting light onto the windshield, and a brightness of the received light is below a brightness threshold. During a precipitation condition, water on the windshield can scatter the emitted infrared light away from the windshield, and the precipitation sensor 110 receiving the emitted infrared light thus receives less light than was emitted by the infrared light emitter. For example, the computer 105 can instruct the infrared light emitter to emit a specified amount of light, and the precipitation sensor 110 can determine an amount of received infrared light. Precipitation can cause the infrared light to escape the vehicle 101, reducing the amount of infrared light received by the precipitation sensor 110. The computer 105 can compare the amount of received infrared light to the amount of emitted infrared light to determine a percentage of infrared light received by the precipitation sensor 110. The computer 105 can determine the amount of precipitation $A_w$ impacting the windshield based on the percentage of infrared light received by the precipitation sensor 110.

The computer 105 can be further programmed to determine an amount of precipitation $A_g$ impacting the ground relative to the amount of precipitation $A_w$ impacting the windshield. For example, the computer 105 can determine the amount of precipitation $A_g$ impacting the ground using the equation below:

$$A_g = (P_s / \sqrt{((V_s + W_s)^2 + P_s^2)}) * A_w$$

In the above equation, $P_s$ is a precipitation speed, $W_s$ is a wind speed, and $V_s$ is a vehicle speed.

The computer 105 can determine the precipitation speed $P_s$, e.g., speed of rain, snow, etc., with one or more sensors 110. As used herein, a "precipitation speed" is an average speed of precipitation prior to striking the windshield. For example, the precipitation sensor 110 can determine the precipitation speed $P_s$ by collecting image data of precipitation striking the windshield and, using image processing techniques, e.g., such as are known, in which images at different times are compared to one another, estimate an average speed of the precipitation crossing the field of view of the precipitation sensor 110.

The computer 105 can determine the wind speed $W_s$ with one or more sensors 110. As used herein, a "wind speed" is the average speed of wind relative to the vehicle. A wind speed sensor 110 can detect the wind speed $W_s$ relative to the vehicle 101. The wind speed sensor 110 can, for example, include a Pitot tube, e.g., may be a Pitot tube airspeed measurement unit. The wind speed sensor 110 can be mounted, i.e., attached, to the vehicle 101 adjacent to the precipitation sensor 110. In this situation, the wind speed sensor 110 can detect the wind speed $W_s$ adjacent to the precipitation sensor 110, which can improve the accuracy of determining the amount of precipitation $A_w$ impacting the windshield, i.e., the precipitation sensor 110.

The computer 105 can determine the vehicle speed $V_s$, e.g., according to data 115 available on a communication bus in the vehicle 101. When the computer 105 receives the message, the computer 105 can compare the vehicle speed $V_s$ to a stored specified operating speed. The specified operating speed is a speed at which to operate the vehicle 101 based on the type of precipitation and a total amount of precipitation $A_p$. The total amount of precipitation $A_p$ is a sum of the amount of precipitation $A_g$ impacting the ground and the amount of precipitation $A_w$ impacting the windshield. For example, the computer 105 could store a look-up table or the like specifying a list of specified operating speeds along with the total amount of precipitation $A_p$, and the type of precipitation. The specified operating speed for an amount and type of precipitation may be determined according to a speed at which it is empirically determined that the vehicle 101 can be safely operated given the detected type of precipitation and the total amount of precipitation $A_p$.

The computer 105 can determine a threshold amount $A_t$ based on the type of precipitation and the speed of the vehicle 101. The threshold amount $A_t$ may be determined according to the vehicle speed $V_s$ and the type of precipitation at which it is empirically determined that the computer 105 can safely operate the vehicle 101 in the autonomous mode given the vehicle speed $V_s$. The threshold amount $A_t$ may be inversely proportional to the vehicle speed $V_s$ when the precipitation is rain. For example, when the vehicle speed $V_s$ is increased, the threshold amount $A_t$ can decrease. When the precipitation is solid, e.g., snow, hail, or sleet, the threshold amount $A_t$ may be no precipitation, i.e., zero. The computer 105 could store a look-up table or the like specifying a list of threshold amounts along with the type of precipitation and the vehicle speed $V_s$. The computer 105 can compare the total amount of precipitation $A_p$ to the threshold amount $A_t$. When the total amount of precipitation $A_p$ is below the threshold amount $A_t$, the computer 105 can operate the vehicle 101 at the vehicle speed $V_s$, i.e., the current speed of the vehicle 101. When the total amount of precipitation $A_p$ is above the threshold amount $A_t$, the computer can reduce the vehicle speed $V_s$ to the specified operating speed.

Table 2 illustrates an example set of data, e.g., a look-up table or the like, that the computer 105 can store to determine the threshold amount $A_t$ of precipitation impacting the windshield.

| Type of precipitation | Vehicle speed $V_s$ | Threshold Amount |
| --- | --- | --- |
| Liquid | 70 mph | 2 drops/sec |
| Liquid | 20 mph | 8 drops/sec |
| Solid | 70 mph | No precipitation |
| Solid | 20 mph | No precipitation |

Additionally, the computer 105 can determine a maximum amount of precipitation $A_m$ based on the type of precipitation and the speed of the vehicle 101. The maximum amount of precipitation $A_m$ may be determined according to the vehicle speed $V_s$ and the type of precipitation at which it is empirically determined that the computer 105 can safely operate the vehicle 101 in the autonomous mode at the specified operating speed. The computer 105 can operate the vehicle 101 in the autonomous mode until the total amount of precipitation $A_p$ exceeds the maximum amount of precipitation $A_m$. The computer 105 could store a look-up table or the like specifying a list of maximum amounts of precipitation $A_m$ along with the type of precipitation and the vehicle speed $V_s$.

The computer 105 can be further programmed to determine a wiper speed, i.e., a speed at which to actuate the wiper 121, based on an accuracy range of the precipitation sensor 110 for a determined vehicle speed $V_s$ and type of precipitation. The accuracy range for a type of precipitation is defined as a set of values specifying amounts of the type of precipitation, the range having upper and lower bounds within which the precipitation sensor 110 is optimized to detect the precipitation, e.g., the amount of the precipitation $A_w$ and the precipitation speed $P_s$. The bounds of the accuracy range are based on the amount of precipitation $A_w$ impacting the precipitation sensor 110. For example, the bounds of the accuracy range can be a maximum amount of precipitation $A_w$ and a minimum amount of precipitation $A_w$ impacting the windshield. In other words, the precipitation sensor 110 is optimized when the amount of precipitation $A_w$ on the windshield is within the accuracy range. The accuracy range of the precipitation sensor 110 is stored in the memory of the computer 105. The computer 105 can determine the wiper speed to maintain the amount of precipitation $A_w$ on the precipitation sensor 110 within the accuracy range. For example, the computer 105 can determine a wiper speed to maintain the amount of precipitation $A_w$ on the windshield within the accuracy range of the precipitation sensor 110. In other words, the computer 105 can determine a wiper speed at which to remove precipitation exceeding the accuracy range of the precipitation sensor 110.

Table 1 illustrates an example set of data, e.g., a look-up table or the like, that the computer 105 can store to determine to determine the accuracy range of the precipitation sensor

| Type of precipitation | Accuracy range |
|---|---|
| Liquid | 0-10 drops/sec? |
| Solid | 0 drops/sec |

The computer 105 can be programmed to actuate the wiper 121 at the wiper speed. After actuating the wiper 121 at the wiper speed, the computer 105 can compare the amount of precipitation $A_w$ impacting the windshield to the accuracy range of the precipitation sensor 110. If the amount of precipitation $A_w$ is outside the accuracy range of the precipitation sensor, the computer 105 can determine a second wiper speed and can actuate the wiper 121 at the second wiper speed. For example, when the amount of precipitation $A_w$ is above the accuracy range, the second wiper speed is faster than the wiper speed, e.g., to remove more precipitation from the windshield. As another example, when the amount of precipitation $A_w$ is below the accuracy range of the precipitation sensor 110, the second wiper speed is slower than the wiper speed, e.g., to remove less precipitation from the windshield. In other words, the computer 105 can determine a plurality of wiper speeds and can actuate the wiper 121 at each wiper speed to maintain the amount of precipitation $A_w$ on the windshield within the accuracy range of the precipitation sensor 110.

The computer 105 can be further programmed to actuate one of the vehicle powertrain 120 and the vehicle brake 120 to adjust, e.g., reduce, the vehicle speed $V_s$ to the specified operating speed for a detected amount and type of precipitation. Additionally, the computer 105 can adjust, e.g., increase, the distance between the vehicle 101 and an object, e.g., a second vehicle, to the distance threshold. The computer 105 can, for example, actuate one of the vehicle powertrain 120 and the vehicle brake 120 to change the vehicle speed $V_s$, e.g., reduce the vehicle speed $V_s$ to the specified operating speed, when the total amount of precipitation $A_p$ exceeds the threshold amount $A_t$. The computer 105 can operate the vehicle 101 in the autonomous mode at or below the specified operating speed until the total amount of precipitation $A_p$ is below the threshold amount $A_t$.

The computer 105 can be further programmed to actuate the vehicle steering component 120 to alter the trajectory of the vehicle 101, e.g., pull the vehicle 101 to the side of road, in addition to actuating one of the vehicle powertrain 120 and the vehicle brake 120, when the total amount of precipitation $A_p$ exceeds the threshold amount $A_t$. When the computer 105 determines that the total amount of precipitation $A_p$ exceeds the threshold amount $A_t$, the computer 105 can direct the vehicle 101 to the shoulder of the road (or another location off of the road) and stop the vehicle, i.e., actuate the vehicle brake 120. The computer 105 can keep the vehicle 101 stopped until the amount of precipitation $A_w$ is below the threshold amount $A_t$.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, BLE, IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
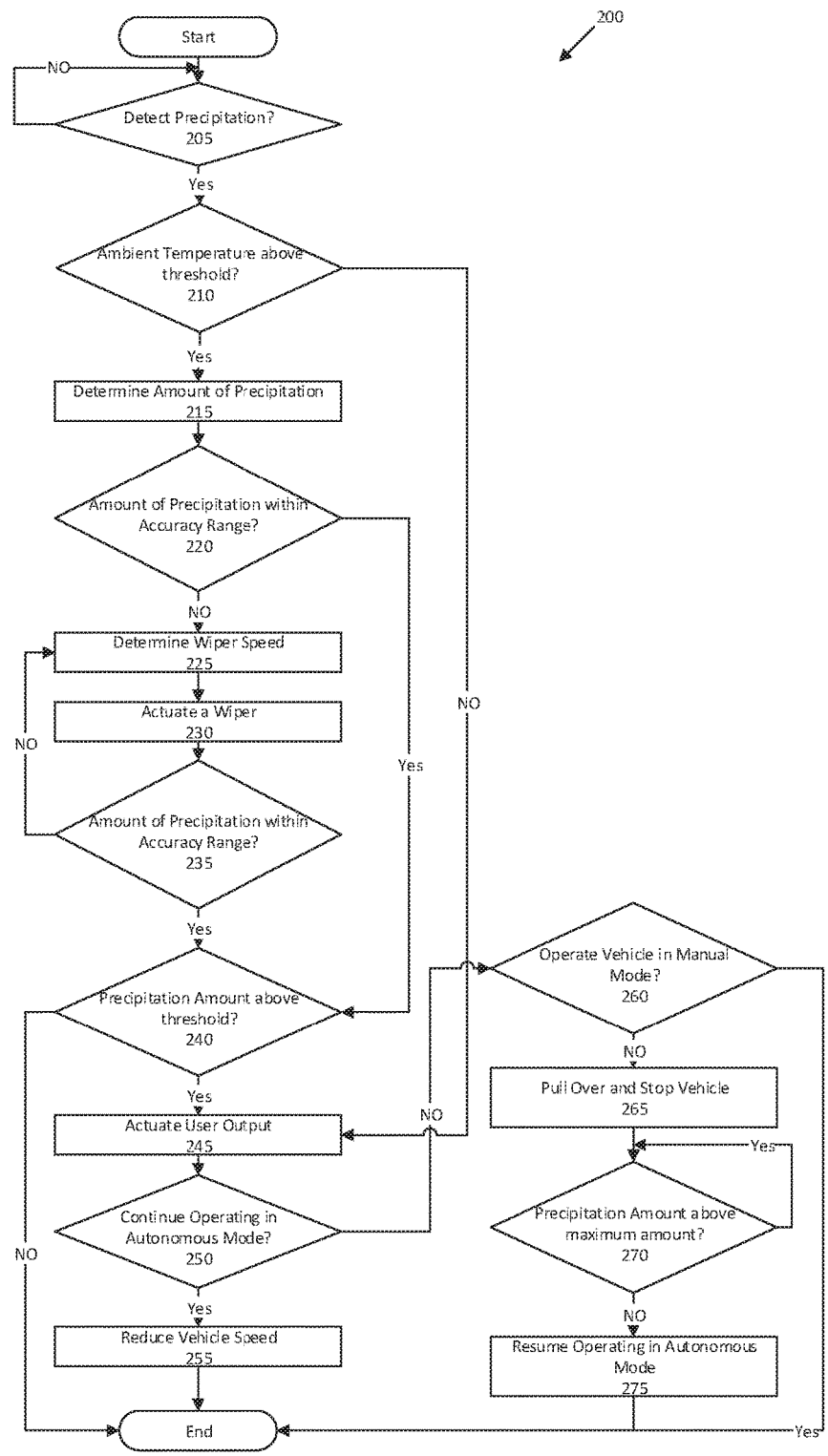
FIG. 2 is an example vehicle precipitation detection process.

FIG. 2 illustrates an example process 200 for determining an amount and type of precipitation, and a speed of a vehicle 101, and actuating a component in the vehicle 101 based on the amount and type of precipitation, and the speed of the vehicle 101. The process 200 can be carried out according to program instructions stored in the memory of the computer 105. The process 200 begins in a block 205, in which the computer detects precipitation outside the vehicle 101. As described above, the computer 105 can detect precipitation from the lidar 111 providing data to the computer 105. If the computer 105 detects precipitation, the process 200 continues in a block 210. Otherwise, the process 200 remains in the block 205.

In the block 210, the computer 105 determines whether the ambient temperature is above the temperature threshold. Typically, one and only one type of precipitation is correlated to a particular ambient temperature (or temperature range) in the computer 105 memory, meaning that the computer 105 can thereby determine the type of precipitation. As described above, the temperature sensor 110 can determine the ambient temperature around the vehicle 101. The computer 105 can receive data 115 from the temperature sensor 110 to determine the type of precipitation. When the ambient temperature is above a threshold temperature for liquid precipitation, i.e., rain, e.g., 32 degrees Fahrenheit, the computer 105 can determine that the precipitation is rain. When the temperature is below the threshold temperature, the computer 105 can determine that the precipitation is solid, e.g., snow, hail, or sleet. If the temperature is above the threshold temperature, the process 200 continues in a block 215. Otherwise, the process 200 continues in a block 230.

In the block 215, the computer 105 can determine the amount of precipitation $A_w$ impacting the windshield, i.e., the lidar 111, and the amount of precipitation $A_g$ impacting the ground. The precipitation sensor 110 can provide data to the computer 105 that includes the amount of precipitation $A_w$ impacting the windshield. As described above, the precipitation sensor 110 can determine the amount of precipitation $A_w$ based on the amount of received infrared light. Additionally, the wind speed sensor 110 and the precipitation sensor 110 can provide data to the computer 105 that includes the wind speed $W_s$ and the precipitation speed $P_s$, respectively. A vehicle 101 communication bus can, for example, provide data that the computer 105 can receive, and that includes the vehicle speed $V_s$. The computer 105 can determine the amount of precipitation $A_g$ impacting the ground relative to the amount of precipitation $A_w$ impacting the windshield according to the equation set forth above.

In a block 220, the computer 105 determines whether the amount of precipitation $A_w$ is within the accuracy range of the precipitation sensor 110. As set forth above, accuracy ranges of the precipitation sensor 110 for various vehicle speeds $V_s$ and types of precipitation are stored in the memory of the computer 105. The computer 105 can compare the amount of precipitation $A_w$ to the accuracy range of the precipitation sensor 110. If the amount of precipitation $A_w$ is within the accuracy range of the precipitation sensor 110, then the process continues to a block 240. Otherwise, the process 200 continues to a block 225.

In the block 225, the computer 105 can determine a wiper speed at which to actuate the wiper 121. For example, the computer 105 can determine the wiper speed that allows the amount of precipitation $A_w$ to be within the accuracy range of the precipitation sensor 110.

In a block 230, the computer 105 actuates the wiper 121 at the wiper speed determined in the block 225. As set forth above, the computer 105 can actuate the actuator 122 to move the wiper 121 from the first position to the second position, and typically, back and forth between the two. The wiper 121 glides along the windshield of the vehicle 101 removing precipitation from the windshield and the precipitation sensor 110.

In a block 235, after actuating the wiper 121, the computer 105 determines whether the amount of precipitation $A_w$ impacting the windshield, as now reduced by the wiper 121, is within the accuracy range of the precipitation sensor 110. If the amount of precipitation $A_w$ is within the accuracy range of the precipitation sensor 110, then the process continues to a block 240. Otherwise, the process 200 returns to the block 225, i.e., the computer 105 can determine a second wiper speed at which to actuate the wiper 121.

In a block 240, the computer 105 determines whether the total amount of precipitation $A_p$ exceeds the threshold amount $A_t$. As described above, the threshold amount $A_t$ is based on the vehicle speed $V_s$ and the type of precipitation, and is stored in the memory of the computer 105, e.g., in a look-up table. For example, when the precipitation is liquid, e.g., rain, the threshold amount $A_t$ may be inversely proportional to the vehicle speed $V_s$, i.e., as the vehicle speed $V_s$ increases, the threshold amount $A_t$ decreases. The computer 105 can determine the threshold amount $A_t$, e.g., from the look-up table, and can compare the total amount of precipitation $A_p$ to the threshold amount $A_t$. If the total amount of precipitation $A_p$ exceeds the threshold amount $A_t$, then the process 200 continues to a block 245. Otherwise, the process 200 ends.

In a block 245, the computer 105 actuates output to the HMI 123 indicating that the amount of precipitation $A_w$ is above the threshold amount $A_t$. For example, the computer 105 can send an instruction to the HMI 123 to display a textual notification. Alternatively, or additionally, the computer 105 can actuate a haptic device and/or a light and/or an audio cue on the HMI 123.

In a block 250, the computer 105 can determine to operate the vehicle 101 in the autonomous mode. As described above, the computer 105 can determine a specified operating speed at which to operate the vehicle 101, e.g., determining a value in a look-up table, based on the total amount of precipitation $A_p$ and the type of precipitation. The computer 105 can determine whether the total amount of precipitation $A_p$ exceeds the maximum amount of precipitation $A_m$. As described above, the maximum amount of precipitation $A_m$ is based on the vehicle speed $V_s$ and the type of precipitation, and is stored in the memory of the computer 105, e.g., in a look-up table. The computer 105 can determine the maximum amount of precipitation $A_m$, e.g., from the look-up table, and can compare the total amount of precipitation $A_p$ to the maximum amount of precipitation $A_m$. If the total amount of precipitation $A_p$ is below the maximum amount of precipitation $A_m$, then the computer 105 can operate the vehicle 101 in the autonomous mode, and the process 200 continues in a block 255. Otherwise, the process continues in a block 260.

In the block 255, the computer 105 actuates one of the vehicle powertrain 120 and the vehicle brake 120. For example, the computer 105 can reduce the vehicle speed $V_s$ by applying the vehicle brake 120. As another example, the computer 105 can reduce the vehicle speed $V_s$ by limiting the output of the vehicle powertrain 120, e.g., limiting the fuel supply to the vehicle 101 engine. Additionally, the computer 105 can increase a distance between the vehicle 101 and a second vehicle. For example, the lidar 111 can send provide data to the computer 105 indicating the distance to the second vehicle. The computer 105 can reduce the vehicle speed $V_s$ such that the distance between the vehicle 101 and the second vehicle exceeds the distance threshold. The computer 105 can reduce the vehicle speed $V_s$ to the specified operating speed, and the process 200 ends.

In the block 260, the computer 105 can determine that the user can operate the vehicle 101 in the manual mode. For example, the user can select the manual mode from the HMI 123, as described above. In this situation, the HMI 123 can send a message to the computer 105 to allow the user to operate the vehicle 101 in the manual mode. If the user selects the manual mode, then the process 200 ends. Otherwise, the process continues to a block 265.

In the block 265, the computer 105 actuates the vehicle steering 120 and one of the vehicle powertrain 120 and the vehicle brake 120. For example, the computer 105 can direct the vehicle 101 to the shoulder of the road, e.g., by actuating the vehicle steering 120 to guide the vehicle 101 to the shoulder, and stop the vehicle 101, e.g., by applying the vehicle brake 120 and limiting output from the vehicle powertrain 120.

In the block 270, the computer 105 determines whether the total amount of precipitation $A_p$ exceeds the maximum amount of precipitation $A_m$. The computer 105 can compare the total amount of precipitation $A_p$ to the maximum amount of precipitation $A_m$. If the total amount of precipitation $A_p$ exceeds the maximum amount of precipitation $A_m$, then the process 200 remains in to the block 270. In other words, the vehicle 101 remains stopped if the total amount of precipitation $A_p$ exceeds the maximum amount of precipitation $A_m$. Otherwise, the process 200 continues to a block 275.

In the block 275, the computer 105 can resume operation of the vehicle 101 in the autonomous mode. In other words, the computer 105 can actuate the vehicle steering 120 and the vehicle powertrain 120 to direct the vehicle 101 back onto the road and to a destination. When the computer 105 resumes operating in the autonomous mode, the process 200 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A method, comprising:
    determining, from sensor data in a vehicle, an amount of precipitation on a windshield, a type of precipitation, and a speed of the vehicle;
    determining an amount of precipitation on a ground surface based on the amount of precipitation on the windshield and the speed of the vehicle;
    determining a total amount of precipitation including a sum of the amount of precipitation on the windshield and the amount of precipitation on the ground; and
    actuating a component in the vehicle based on the total amount of precipitation, the type of precipitation, and the speed of the vehicle.

2. The method of claim 1, further comprising:
    determining a wiper speed based on the total amount of precipitation, the type of precipitation, and the speed of the vehicle;
    wherein actuating the component in the vehicle based on the total amount of precipitation, the type of precipitation, and the speed of the vehicle, includes actuating the component based on the wiper speed.

3. The method of claim 2, wherein the component is a wiper, and actuating the component includes actuating the wiper according to the wiper speed.

4. The method of claim 2, further comprising:
    determining a second wiper speed based on the total amount of precipitation, the type of precipitation, and the speed of the vehicle;
    wherein actuating the component in the vehicle based on the total amount of precipitation, the type of precipitation, and the speed of the vehicle, includes actuating the component based on the second wiper speed.

5. The method of claim 2, further comprising determining the wiper speed based further on an accuracy range of a precipitation sensor.

6. The method of claim 1, wherein the component is one or both of a vehicle powertrain component and a vehicle brake component, and actuating the component includes changing the speed of the vehicle based on the total amount of precipitation, the type of precipitation, and the speed of the vehicle.

7. The method of claim 1, further comprising:
determining a wind speed relative to the vehicle;
determining the amount of precipitation on the ground based further on the wind speed;
wherein actuating the component in the vehicle based on the total amount of precipitation, the type of precipitation, and the speed of the vehicle, further includes actuating the component based on the wind speed.

8. The method of claim 1, wherein the component is a vehicle steering component, and actuating the component includes activating the vehicle steering component.

9. A system, comprising a processor; and a memory, the memory storing instructions executable by the processor to:
determine, from sensor data in a vehicle, an amount of precipitation on a windshield, a type of precipitation, and a speed of the vehicle;
determine an amount of precipitation on a ground surface based on the amount of precipitation on the windshield and the speed of the vehicle;
determine a total amount of precipitation including a sum of the amount of precipitation on the windshield and the amount of precipitation on the ground; and
actuate a component in the vehicle based on the total amount of precipitation, the type of precipitation, and the speed of the vehicle.

10. The system of claim 9, wherein the processor is further programmed to determine a wiper speed based on the total amount of precipitation, the type of precipitation, and the speed of the vehicle, and to actuate the component based on the wiper speed.

11. The system of claim 10, wherein the component is a wiper, and the processor is further programmed to actuate the wiper according to the wiper speed.

12. The system of claim 10, wherein the processor is further programmed to determine a second wiper speed based on the total amount of precipitation, the type of precipitation, and the speed of the vehicle, and to actuate the component based on the second wiper speed.

13. The method of claim 2, further comprising determining the wiper speed based further on an accuracy range of a precipitation sensor.

14. The system of claim 9, wherein the component is one or both of a vehicle powertrain component and a vehicle brake component, and wherein the processor is further programmed to change the speed of the vehicle based on the total amount of precipitation, the type of precipitation, and the speed of the vehicle.

15. The system of claim 9, wherein the processor is further programmed to determine a wind speed relative to the vehicle, determine the amount of precipitation on the ground based further on the wind speed, and to actuate the component based further on the wind speed.

16. The system of claim 9, wherein the component is a vehicle steering component, and the processor is further programmed to activate the vehicle steering component.

17. A system comprising;
a wiper;
an actuator arranged to move the wiper; and
a processor programmed to:
determine, from sensor data in a vehicle, an amount of precipitation on a windshield, a type of precipitation, and a speed of the vehicle;
determine an amount of precipitation on a ground surface based on the amount of precipitation on the windshield and the speed of the vehicle;
determine a total amount of precipitation including a sum of the amount of precipitation on the windshield and the amount of precipitation on the ground; and
actuate a component in the vehicle based on the total amount of precipitation, the type of precipitation, and the speed of the vehicle.

18. The system of claim 17, wherein the processor is further programmed to determine a wiper speed based on the total amount of precipitation, the type of precipitation, and the speed of the vehicle, and actuate the component based on the wiper speed.

19. The method of claim 2, further comprising determining the wiper speed based further on an accuracy range of a precipitation sensor.

20. The system of claim 17, wherein the component is one or both of a vehicle powertrain component and a vehicle brake component, and the processor is further programmed to change the speed of the vehicle based on the total amount of precipitation, the type of precipitation, and the speed of the vehicle.

* * * * *